(12) United States Patent
Hahn et al.

(10) Patent No.: US 8,286,940 B2
(45) Date of Patent: Oct. 16, 2012

(54) NOZZLE SHUTOFF FOR AN INJECTION MOLDING MACHINE

(75) Inventors: John J. Hahn, Germantown, WI (US); Larry A. Schmitt, Colgate, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 1076 days.

(21) Appl. No.: 12/204,862

(22) Filed: Sep. 5, 2008

(65) Prior Publication Data
US 2010/0062100 A1 Mar. 11, 2010

(51) Int. Cl.
*F16K 5/00* (2006.01)
(52) U.S. Cl. .............. 251/317; 137/246; 137/315.25; 251/314; 251/359
(58) Field of Classification Search .......... 251/309, 251/314, 316, 359, 364, 317–317.01; 137/246–246.22, 315.25, 315.26
See application file for complete search history.

(56) References Cited

U.S. PATENT DOCUMENTS

| | | | | |
|---|---|---|---|---|
| 3,151,836 A | * | 10/1964 | Haddick et al. | 251/175 |
| 3,432,143 A | * | 3/1969 | Johnson | 251/317 |
| 3,567,177 A | * | 3/1971 | Mueller | 251/188 |
| 4,015,816 A | * | 4/1977 | Semon | 251/285 |
| 4,262,880 A | * | 4/1981 | Danko et al. | 251/288 |

FOREIGN PATENT DOCUMENTS
EP 494304 A1 * 7/1992
* cited by examiner

*Primary Examiner* — John K Fristoe, Jr.
*Assistant Examiner* — David Colon Morales
(74) *Attorney, Agent, or Firm* — Boyle Fredrickson, S.C.

(57) ABSTRACT

The present invention is directed to an injection molding valve configured to prevent the leaking or stringing of injected thermoplastic from the valve. The valve includes a housing having a first bore along a length thereof and a second bore intersecting the first bore. A rotatable member is inserted through the second bore and is in communication with a lever for the actuation thereof. The rotatable member includes a hole therethrough such that when the hole is aligned with the first bore, thermoplastic may travel freely through the first bore. The second bore further includes at least one groove in communication with a port for receiving injected thermoplastic. The injected thermoplastic is hardened to form an seal therein and configured to prevent thermoplastic from leaking out of the valve housing.

20 Claims, 3 Drawing Sheets

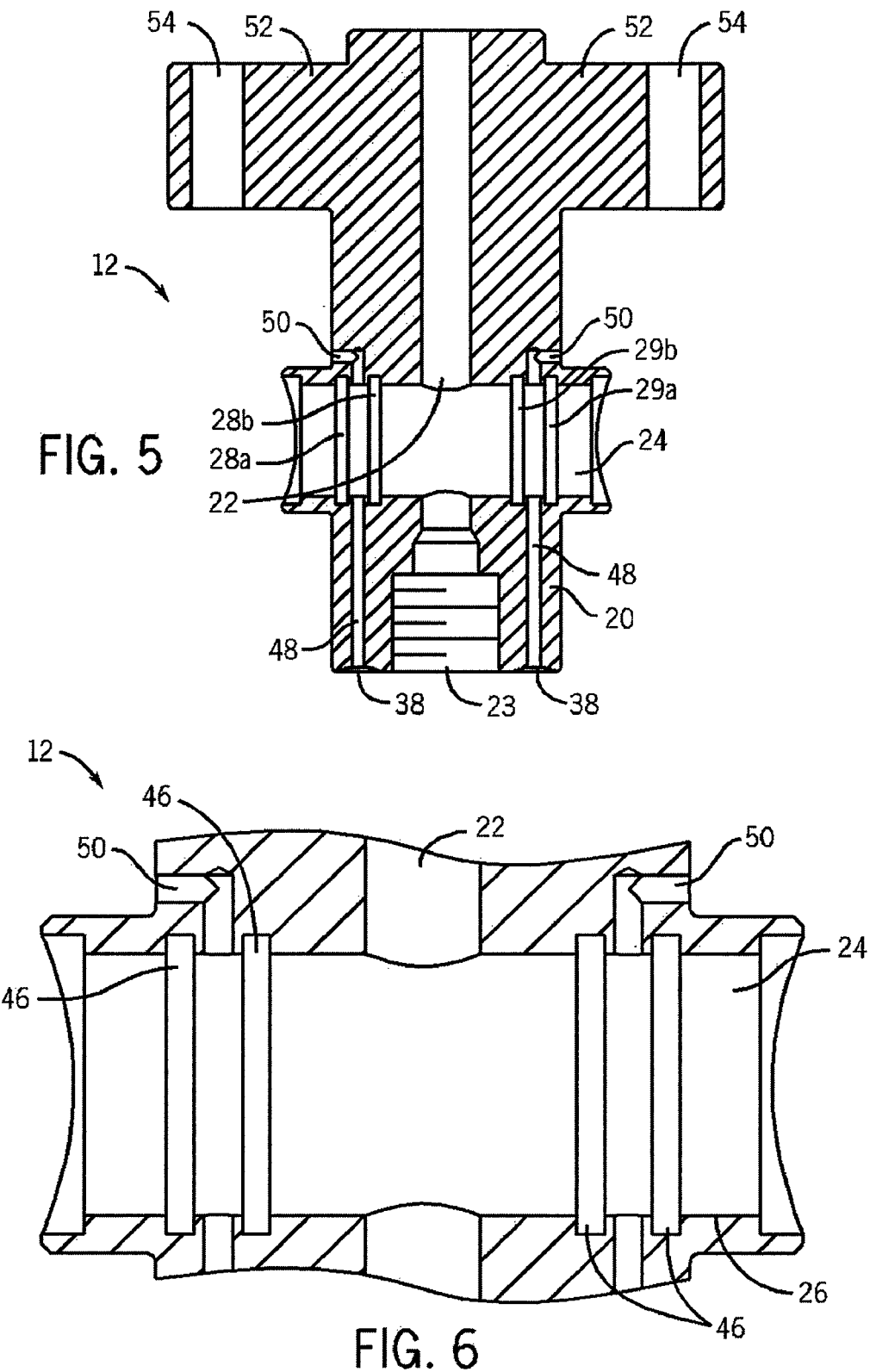

NOZZLE SHUTOFF FOR AN INJECTION MOLDING MACHINE

STATEMENT REGARDING FEDERALLY SPONSORED RESEARCH OR DEVELOPMENT

CROSS REFERENCE TO RELATED APPLICATION

BACKGROUND OF THE INVENTION

The present invention relates to injection molding machines, and in particular, to a valve for an injector nozzle on an injection molding machine adapted to prevent the stringing of thermoplastic residue from the nozzle.

Injection molding is a manufacturing process in which heated thermoplastic is forced under pressure into a mold to produce a part. The heated thermoplastic is delivered at relatively high temperatures and under high pressure from an injector. After cooling, the hardened part is removed from the cavity of the mold and the operation is repeated, normally cycling the mold repeatedly to make one part after another.

For two-shot and other sophisticated molding operations, the injector may be separated from the mold to permit mold movement or exchange. During this period of separation, heated thermoplastic may undesirably "string" from the injector nozzle. To avoid this problem, the injector may include a valve in communication with the nozzle and adapted to regulate the dispensing of the injection thermoplastic. Such valves may be automatically configured to turn the flow of thermoplastic on and off by using a pressure sensitive check valve or by mechanical actuation of a valve lever tied to the injection molding machine mechanism.

In this latter design, pressurized thermoplastic material can undesirably leak along the path of the valve operator producing a problem similar to that of the stringing and or preventing free operation of the valve mechanism as a result of contamination.

SUMMARY OF THE INVENTION

The present invention provides an improved valve for an injector nozzle preventing the stringing of injection mold material from the nozzle of an injection molding nozzle after completing the filling a mold.

Specifically, the present invention is directed to an injection molding valve including a housing having a first bore extending along a length of the housing for the flow of thermoplastic to the nozzle. The housing further includes a second bore intersecting the first bore and including a groove disposed circumferentially disposed on a wall of the second bore between the first bore and outside of the housing. A rotatable member is positioned within the second bore and includes a hole therethrough. An operator is coupled to the rotatable member for rotating the rotatable member between an open position where the hole is aligned with the first bore and a closed position where the hole is perpendicular to the first bore. A port is provided in communication with the groove of the wall of the second bore. The port is configured to receive thermoplastic and deliver it to the groove to form a mold-in-place seal. The mold-in-place seal serves to prevent the stringing of thermoplastic injected through the first bore from stringing out of the valve housing through the second bore.

Thus, it is an object of at least one embodiment of the present invention to provide for the insertion of a thermoplastic resistant seal into a valve that may prevent stringing of thermoplastic material through the valve housing through use of a mold-in-place technique. The mold-in-place technique permits a low compliance material to be selected without concern for tolerances in the valve or the need to compress the seal during assembly. By using a thermoplastic material injected into the valve, the properties of the seal may better match the thermoplastic being molded in terms of expansion and adhesion to resist leakage.

The valve of the present invention may also include a groove on the surface of the rotatable member and aligned with the groove on the wall of the second bore.

Thus, it is yet another object of the present invention to provide a pair of grooves for receiving thermoplastic to form seals.

The operator of the valve may comprise a lever.

It is yet another object of the present invention to provide a method for sealing a standard valve configuration having a lever operator.

The rotatable member of the present invention may comprise a cylinder.

Thus, it is another object of the present invention to provide a relatively simple valve construction allowing low tolerances with standard machining.

The port of the present invention may be provided within the housing of the valve.

It is thus another object of the present invention to provide a simple method of injecting the thermoplastic to form the seals for the valve of the present invention.

The valve of the present invention may further comprise a second groove circumferentially disposed on the wall of the second bore and positioned between the first bore and the outside of the housing.

Thus, it is yet another object of the present invention to provide a pair of seals such that thermoplastic injected through the first bore is prevented from stringing out either side of the second bore of the valve housing.

The valve of the present invention may additionally include a channel disposed between the first and second grooves such that the thermoplastic injected through the port is delivered to the second groove by way of the channel between the first groove a second groove.

It is thus another object of the present invention to provide a single means for providing a pair of seals disposed within the housing of the valve.

These particular features and advantages may apply to only some embodiments falling within the claims and thus do not define the scope of the invention.

BRIEF DESCRIPTION OF THE DRAWINGS

FIG. 5 is a cross section of another embodiment of the valve of the present invention; and FIG. 6 is a partial cross section of the valve of FIG. 5.

DETAILED DESCRIPTION OF THE PREFERRED EMBODIMENT

Figure 1:
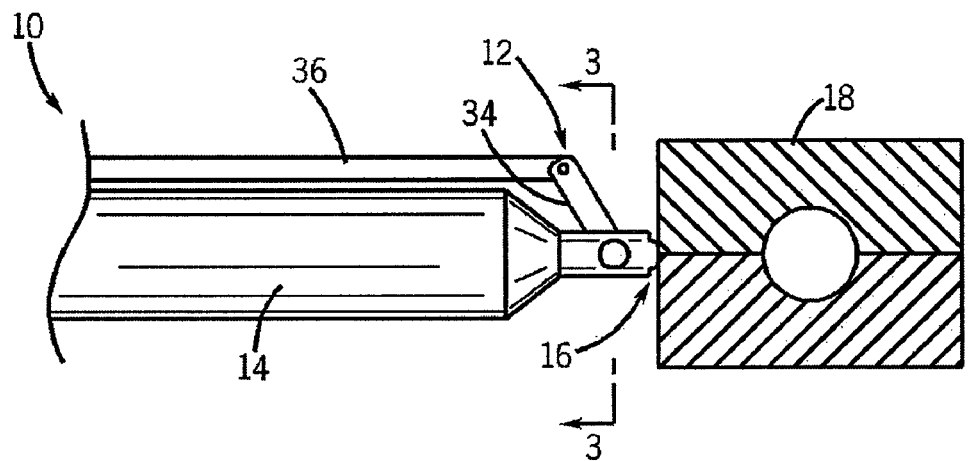
FIG. 1 is a side elevation view of an injection molding system equipped with the valve of the present invention as connected to a mold shown in cross-section.

Referring now to the drawings, and initially to FIG. 1, an injection molding system 10 is equipped with the valve 12 of the present invention. Injection molding system 10 includes an injector 14 for heating and ejecting molten the thermoplastic material. The injector 14 has a threaded nozzle that is attached to valve 12 that conducts firmer plastic material from the injector 14 to a nozzle 16. Nozzle 16 is configured to abut a mold 18 and to deliver the thermoplastic material under substantially high pressures and temperatures to the mold 18. Valve 12 regulates the flow of the thermoplastic material from the injector 14 to the nozzle 16 to the mold 18.

Figure 2:
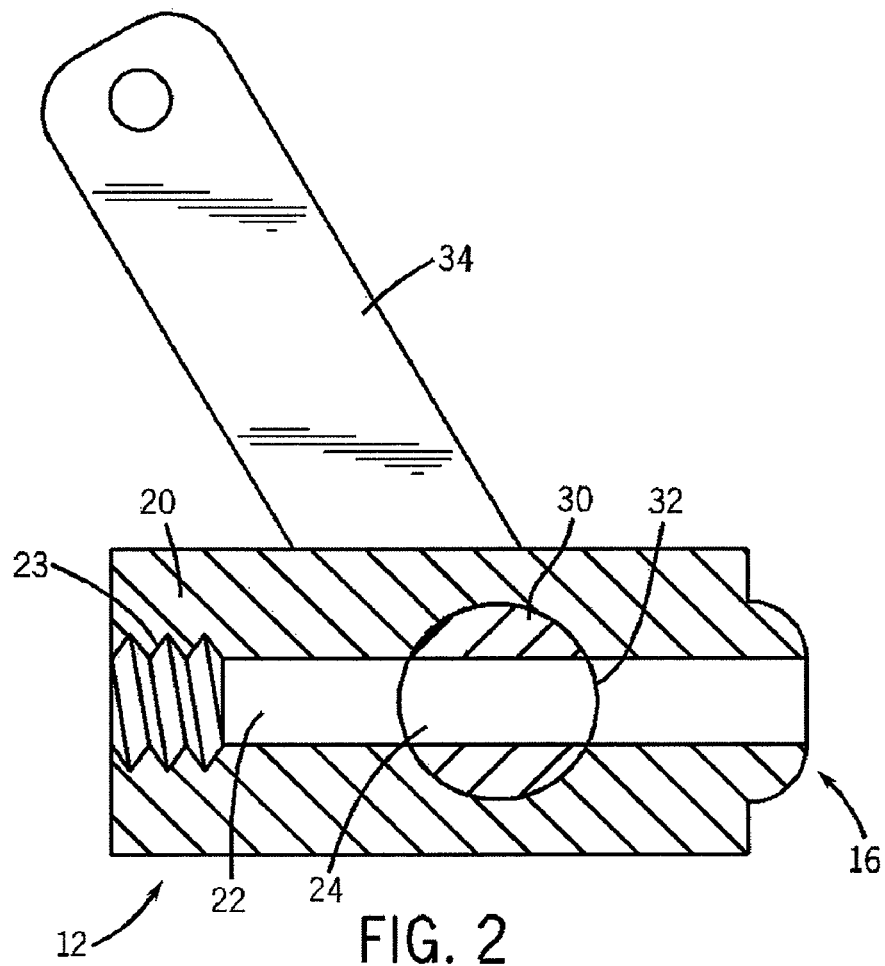
FIG. 2 is side elevation cross section of a housing of the valve of the present invention providing a valve body and a rotatable valve core.
Figure 3:
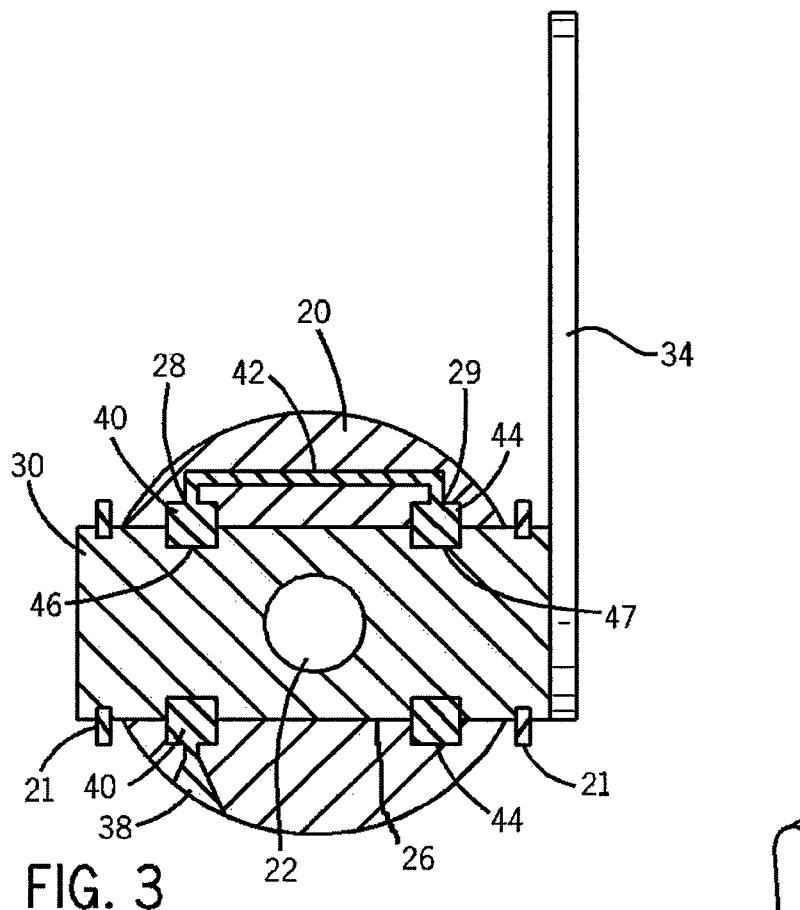
FIG. 3 is a cross section taken along lines 3-3 of FIG. 1 of the valve of the present invention showing the mold-in-place, seals of the present invention.
Figure 4:
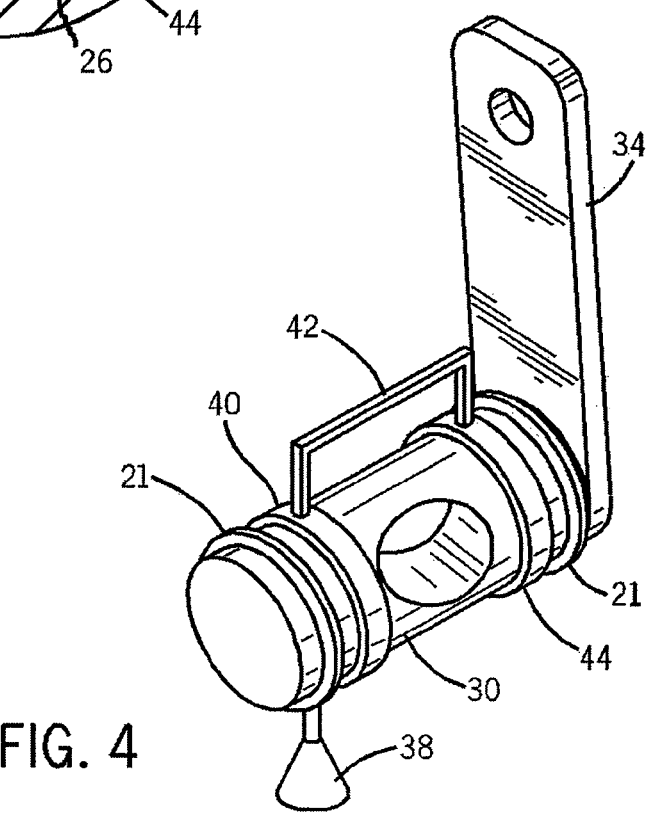
FIG. 4 is a perspective view of the valve core and seals of the present invention removed from the valve body for clarity.

Referring now to FIGS. 2-4, the valve 12 of the present invention includes a housing 20 having a first bore 22 extending along the length of housing 20 to open at opposite ends of the housing 20 providing a channel therethrough between the injector 14 (not shown in FIG. 2) and the nozzle 16. A second bore 24 extends across the width of housing 20 and defining a bore wall 26. First bore 22 may be positioned perpendicular to second bore 24 or may otherwise be configured to intersect second bore 24. Wall 26 includes a first groove 28 circumferentially disposed on wall 26 of second bore 24 between an right side outside of the housing 20 (as depicted) and the intersection of the second bore 24 with the first bore to block plastic flow along the second bore 24.

A rotatable member 30 is positioned within second bore 24 and includes a hole 32 through the center thereof. Rotatable member 30 may comprise a cylinder or ball or other shape having a rotational symmetry to rotate within the second bore 24 while fitting snugly against the bore walls 26 of the second bore 24 outside of the first bore 22. Exposed ends of the rotatable member 30 extending outside of the housing 20 are secured by snap rings 21 or the like. An operator 34 is coupled to the rotatable member 30 and is configured to rotate the rotatable member 30 between an open position wherein hole 32 is aligned with the first bore 22 and a closed position wherein the hole 32 is positioned perpendicular to the first bore 22.

Operator 34 may be a lever or similar such actuator capable of rotating rotatable member 30 between the open and closed positions. Operator 34 may be attached to other mechanisms associated with the injection molding machine to be automatically actuated. For example, operator 34 may be coupled to an actuator arm 36 in communication with or otherwise configured to actuate operator 34 between its open and closed positions.

A port 38 is disposed on the outside of housing 20 and is in communication with first groove 28. Port 38 is configured to receive injected thermoplastic and deliver the injected thermoplastic to first groove 28. Accordingly, the injected thermoplastic is received by first groove 28 and allowed to harden such that the hardened injected thermoplastic forms a first seal 40. Seal 40 is configured to prevent the thermoplastic injected from nozzle 16 through first bore 22 from leaking or otherwise stringing out of the valve housing by creating a seal to prevent leakage from housing 20 and thus is selected to be solid at normal operating temperatures of the valve.

When the second bore 24 goes through the housing (and is not a blind bore) bore wall 26 includes a circumferential second groove 29. A channel 42 is preferably disposed between first groove 28 and second groove 29 such that the thermoplastic injected through port 38 is delivered from first groove 28 to second groove 29 until enough thermoplastic is delivered to second groove 29 to form a second seal 44 therein. Second seal 44, like first seal 40 prevents thermoplastic injected through first bore 22 from leaking out of housing 20. Preferably, first groove 28 and second groove 29 are circumferentially disposed along wall 26 on opposite sides of first bore 22 such that thermoplastic is prevented from leaking out either side of housing 20 by way of second bore 24.

In yet another embodiment of the present invention, rotatable member 30 comprises a first groove 46 aligned with first groove 28 of wall 26 such that the thermoplastic injected through port 38 is configured to be seated in the mating relationship between the first groove 28 of wall 26 and first groove 46 of rotatable member 30. As such, first seal 40 is formed by the hardened thermoplastic formed by aligned grooves 28 and 46 in both of the second bore 24 and rotatable member 30. Similarly, in another embodiment of the system 10 of the present invention, rotatable member 30 includes a second groove 47 aligned with second groove 29 of wall 26 such that the thermoplastic injected through port 38 and channel 42 is seating in a mating relationship between both first groove 28 of wall 26 and first groove 46 of rotatable member 30 as well as second groove 29 of wall 26 and second groove 47 of rotatable member 47. Accordingly, second seal 44 is formed therebetween.

Referring now to FIGS. 5-6 another embodiment of the valve 12 of the present invention includes a housing 20 having a first bore 22 extending along a length thereof to define an injection path for the nozzle 16 of injector 14. A second bore 24 extends across the width of housing 20 intersecting first bore 22 and defining a wall 26. Wall 26 includes a pair of first grooves 28a and 28b and a pair of second grooves 29a and 29b circumferentially disposed thereon and configured to receive thermoplastic injected through ports 38. The injected thermoplastic travels along channels 48 and is received by first grooves 28a, 28b and second grooves 29a, 29b. A pair of outlets 50 are disposed on each side of the housing 20 thereof and in communication with channels 48 to expel air and/or excess thermoplastic during the filling of grooves 28a, 28b and 29a, 29b.

The housing 20 of valve 12 of the present invention further comprises a pair of flanged surfaces 52 having bores 54 therethrough for receiving fasteners such as bolts (not shown). The fasteners are preferably adapted to couple the valve 12 to the injector 14 and nozzle 16 of the injection molding system 10 of the present invention.

It is specifically intended that the present invention not be limited to the embodiments and illustrations contained herein, but include modified forms of those embodiments including portions of the embodiments and combinations of elements of different embodiments as come within the scope of the following claims.

We claim:

1. An injection molding valve comprising:
   a housing having a first bore extending across a length of the housing and a second bore intersecting the first bore and including at least one groove disposed circumferentially on a wall of the second bore between the first bore and outside of the housing;
   a rotatable member positioned within the second bore having a hole through the rotatable member;
   an operator coupled to the rotatable member to rotate the rotatable member between an open position wherein the hole in the rotatable member is aligned with the first bore and a closed position wherein the hole is positioned to block to the first bore;
   a port in communication with the at least one groove, wherein the port is configured to receive thermoplastic therethrough to deliver thermoplastic to the groove of the wall; and the port and at least one groove are fluidly isolated from a passage fluidly connected to the hole through the rotatable member; and a molded-in-place thermoplastic seal fitting within the groove and port to prevent thermoplastic injected along the first bore from stringing out of the valve through the second bore or port.

2. The valve of claim 1 wherein the rotatable member comprises at least one groove circumferentially disposed thereon and adapted to be aligned with the at least one groove of the housing and wherein the seal formed from the hardened thermoplastic is configured to be seated between the groove of the wall and the groove of the rotatable member.

3. The valve of claim 1 wherein the operator is a lever.

4. The valve of claim 1 wherein the rotatable member comprises a cylinder.

5. The valve of claim 1 wherein the first bore is perpendicular to the second bore.

6. The valve of claim 1 wherein the port is disposed within the housing.

7. The valve of claim 1 wherein the wall of the second bore includes a first and second circumferential groove disposed thereon, the first and the second circumferential grooves positioned between the first bore and outside of the housing.

8. The valve of claim 7 further comprising a channel disposed between the first and second groove of the wall of the second bore wherein the channel is configured to deliver thermoplastic from the first groove to the second groove to form a pair of seals.

9. The valve of claim 7 wherein the rotatable member includes a first and second groove circumferentially disposed thereon and adapted to be aligned with the first and second grooves of the wall of the second bore.

10. The valve of claim 9 further comprising a channel disposed between the first and second groove of the wall of the second bore wherein the channel is configured to deliver thermoplastic from the first groove to the second groove of the wall to form a pair of seals configured to be seated between the grooves of the wall and the rotatable member.

11. The valve of claim 1 wherein one end of the first bore is threaded for receiving an injection molding nozzle.

12. A method of making a shutoff valve for an injection molding nozzle comprising the steps of:
    providing a housing having a first bore extending along a length of the housing and a second bore extending along a width of the housing, wherein the second bore defines an interior wall having a first groove disposed on a surface of the wall;
    inserting a rotatable member having a hole through the center in the second bore;
    coupling an operator to the rotatable member, wherein the operator is configured to rotate the rotatable member between an open position wherein the hole is aligned with the first bore and a closed position wherein the hole is perpendicular to the first bore; and
    injecting thermoplastic through a port in communication with the groove of the wall;
    hardening the injected thermoplastic to form a seal seated in the groove of the wall to prevent the stringing of thermoplastic injected through the first bore from entering the valve housing.

13. The method of claim 12 further comprising the step of:
    providing a first groove on the rotatable member aligned with the first groove of the wall, wherein the hardened thermoplastic is configured to be seated between the first groove of the wall and the first groove of the rotatable member.

14. The method of claim 12 further comprising the step of:
    providing a second groove on the wall of the second bore, wherein the second groove of the wall is in communication with the port to receive the injected thermoplastic for forming a seal to prevent stringing thermoplastic injected through the first bore from entering the valve housing.

15. The method of claim 14 further comprising the step of:
    providing a second groove disposed on the rotatable member aligned with the second groove of the wall for receiving thermoplastic therebetween.

16. The method claim 12 further comprising the step of:
    providing a second groove on the wall of the second bore and a channel disposed between the first groove and the second groove of the wall, wherein the channel is configured to deliver thermoplastic injected through the port from the first groove to the second groove for forming a seal in the first and second grooves.

17. The method of claim 16 further comprising the step of:
    providing a second groove disposed on the rotatable member aligned with the second groove of the wall for receiving thermoplastic therebetween.

18. The method of claim 12 wherein the operator comprises a lever.

19. The method of claim 12 further comprising the step of:
    positioning the first bore perpendicular to the second bore.

20. The method of claim 12 wherein the rotatable member comprises a cylinder.

* * * * *